UNITED STATES PATENT OFFICE.

PETER VOGEL AND HUBERT HATSCHER, OF SPRINGFIELD, MASSACHUSETTS.

BEVERAGE AND PROCESS OF COMPOUNDING SAME.

SPECIFICATION forming part of Letters Patent No. 596,222, dated December 28, 1897.

Application filed May 21, 1897. Serial No. 637,615. (No specimens.)

*To all whom it may concern:*

Be it known that we, PETER VOGEL, a citizen of Germany, and HUBERT HATSCHER, a citizen of the United States of America, residents of Springfield, county of Hampden, and State of Massachusetts, have invented new and useful Improvements in a Composition of Matter—to wit, a Beverage—and in the Process of Compounding the Same, of which the following is a specification.

Our invention relates to a beverage which we term "champagne weiss beer."

The object of our invention is to produce a beverage which, while being so far free from alcohol that it is "non-intoxicating" or of. a character known as a "temperance drink," will have a sparkling and clear appearance, will be inexpensive in cost of manufacture, and a pleasant and desirable beverage. The method of compounding the same and the materials employed are as follows, in substantially the proportions herein set out.

Our composition or beverage consists of the following ingredients, combined in the proportions stated—viz: lager-beer, one barrel; filtered water, one barrel; granulated sugar, six pounds; salt, three and one-half ounces; weinstein, (argol,) four and one-half ounces; kraeusen, four quarts.

The ingredients above named are all well known to the general public except "weinstein" (argol) and "kraeusen," and these are terms well known to those skilled in the art of compounding beer. Weinstein, also known as "argol," is the material which has the appearance of rock-candy and which is deposited on the walls of the vats during the manufacture of wine while the wine is in the curing-vats, where it frequently remains for one or two years, during which time the weinstein or argol becomes deposited or precipitated, as stated. Kraeusen is known by brewers to be beer in its first stages of fermentation; or, to state it in other words, in the process of manufacturing lager-beer the compound which ultimately becomes lager-beer passes through various stages of fermentation, and while in the first stage of fermentation it is known as "kraeusen."

The ingredients are preferably mixed or compounded as follows: The barrel of lager-beer and about one barrel of filtered water are mixed. The salt, sugar, and weinstein or argol are each separately reduced to a finely-powdered state and each separately dissolved in water. After the powdered materials have all been dissolved the solutions and the kraeusen are all mixed with the mixture of water and beer, care being taken to carefully and thoroughly intermix. The compound is then bottled, the bottles, however, being left uncorked or open until fermentation begins. This usually takes about from four to five days, depending, of course, upon the temperature and other conditions familiar to those skilled in the art of making beer. As soon as fermentation begins the bottles are carefully corked and kept at a temperature of from two to ten degrees above freezing for from ten to fourteen days, during which time the bottles should be occasionally partially rotated back and forth by a quick motion of the hand, or, in other words, shaken by a rotary motion, so as to cause the sediments, if any there be, to thoroughly dissolve. The thermometric scale herein referred to is Fahrenheit. The beverage thus compounded may then be stored in any convenient place for a great length of time and will retain its desirable qualities.

When the beverage is to be served and used it is advisable that it, like other beverages, should be placed in a cool place—a few degrees, for instance, above freezing—before using, so that at the time of its being poured into the glass the gas will not escape too rapidly.

Having therefore described our invention, what we claim, and desire to secure by Letters Patent, is—

1. The herein-described composition of matter to be used as a beverage, consisting of lager-beer, water, sugar, salt, weinstein (argol) and kraeusen in the proportions substantially as stated.

2. The herein-described method of compounding a beverage consisting of mixing the ingredients herein specified in the proportions substantially as set forth, leaving the same open until fermentation begins, then closing the same, all substantially as shown.

PETER VOGEL.
HUBERT HATSCHER.

Witnesses:
ALLEN WEBSTER,
M. E. GERTZE.